Figure 1:
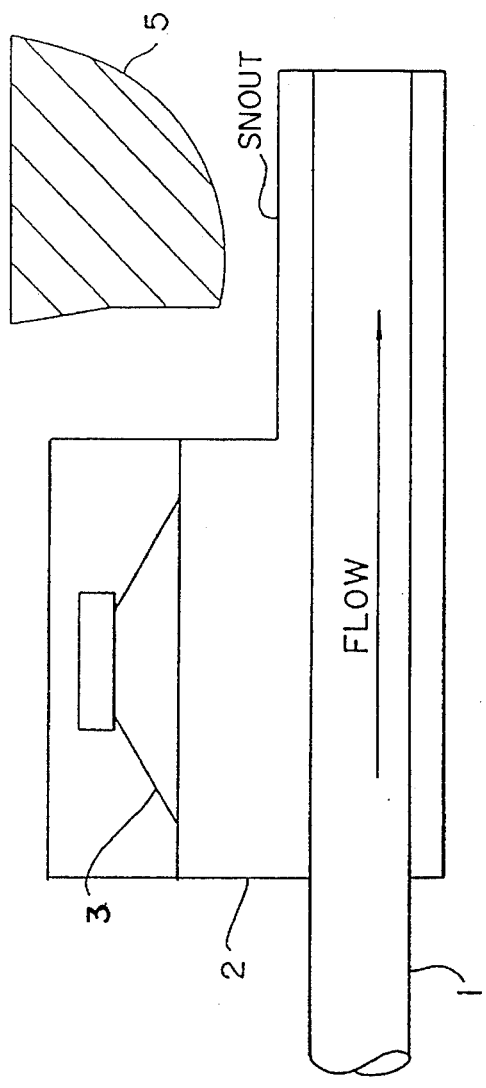

United States Patent [19]

Langley

[11] Patent Number: 5,600,106

[45] Date of Patent: Feb. 4, 1997

[54] ACTIVELY SOUND REDUCED MUFFLER HAVING A VENTURI EFFECT CONFIGURATION

[75] Inventor: Andrew J. Langley, Welwyn, Great Britain

[73] Assignee: Noise Cancellation Technologies, Inc., Linthicum, Md.

[21] Appl. No.: 647,538

[22] Filed: May 15, 1996

Related U.S. Application Data

[62] Division of Ser. No. 211,838, May 24, 1994, Pat. No. 5,550,334.

[51] Int. Cl.⁶ .................................................. F01N 1/06
[52] U.S. Cl. ............................................ 181/206; 381/71
[58] Field of Search ........................... 181/206, 227, 181/228, 282, 283; 381/71

[56] References Cited

U.S. PATENT DOCUMENTS

| 5,088,575 | 2/1992 | Eriksson | 181/206 |
| 5,097,923 | 3/1992 | Ziegler et al. | 181/206 |

FOREIGN PATENT DOCUMENTS

| 5-98927 | 4/1993 | Japan | 181/206 |

*Primary Examiner*—Khanh Dang
*Attorney, Agent, or Firm*—Crowell & Moring

[57] ABSTRACT

In an actively sound dampened muffler, the improvement of a venturi effect area producing means adjacent an aperture in said muffler near which is mounted a loudspeaker in an enclosure, the venturi effect area preventing hot exhaust gases from impinging on the loudspeaker.

5 Claims, 3 Drawing Sheets

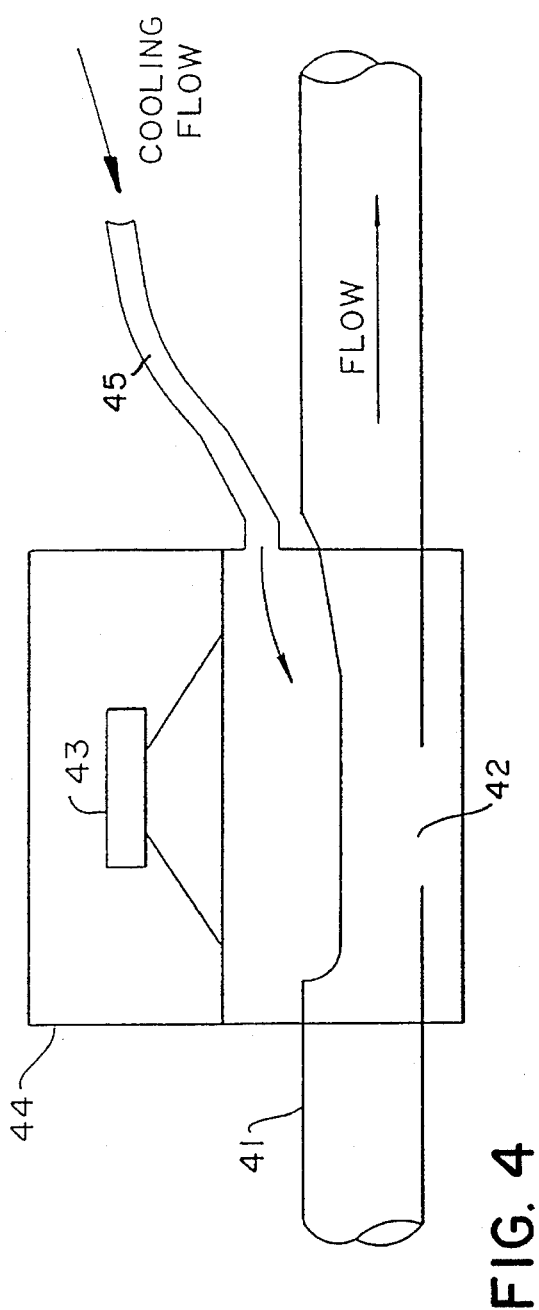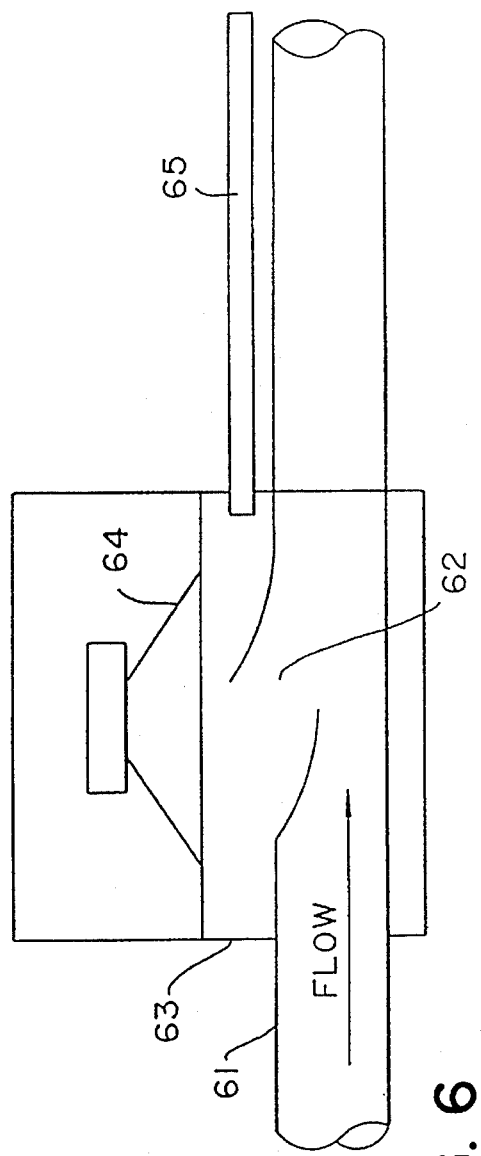

ACTIVELY SOUND REDUCED MUFFLER HAVING A VENTURI EFFECT CONFIGURATION

This application is a division of application Ser. No. 08/211,838 filed May 24, 1994 which application is now: U.S. Pat. No. 5,550,334.

In the design of active noise controlled mufflers a common problem is the resulting lengthy extension which protrudes beyond the main enclosure to the end of the vehicle resulting in an unattractive "snout". Beyond the physical undesirability of this extension there is a more serious problem created and that is the large acoustic air mass that resides in the snout. As this air mass is extremely difficult to move to and fro at high frequencies the result is a small amount of anti-sound being generated.

To overcome this problem it is proposed to keep the extension or snout short which reduces the moving mass. The solution has typically resulted in a configuration that has a very short link between the loudspeaker and the pipe and wherein the loudspeaker is typically placed far from the engine for the benefit of reduced sound pressure and temperature. The controller can then cancel the exhaust noise provided only one acoustic mode can propagate in the exhaust pipe over the control bandwidth. The loudspeaker enclosure volume may be reduced somewhat and the diameter of the tailpipe need not be larger than normal. The problems with this solution were that the loudspeaker is subjected to high temperatures as well as the corrosive effects of exhaust gases.

To solve these residual problems the instant invention manipulates the mean flow of the exhaust gases to cool the loudspeaker enclosure. Either a full or partial venturi is used to generate an area that is below atmospheric pressure. A bleed pipe allows ambient air to flow into this area thereby counteracting the flow of exhaust gases into the speaker area. A filter can be provided in the bleed pipe to reduce the radiated noise. Additionally a heat shield can be employed to protect the loudspeaker from the exhaust pipe or, instead, a reflective coated layer that conducts sound. To prevent a sudden reversal of the cooling air the configuration is designed to allow the cooling flow to maintain the exhaust gas concentration in the front cavity at a reasonable level. A diffuser section can be used to accomplish this as well as a contracted section followed immediately by an expansion section. Cooling can also be accomplished by using the cooling fluid of the vehicle or by using separate fans. Both would entail additional expenditures and add a degree of complexity to the configuration.

Therefore, it is an object of this invention to provide an improved muffler that eliminates the long loudspeaker enclosure.

Another object of this invention is to provide an actively controlled noiseless muffler having a short connection between the exhaust pipe and the loudspeaker enclosure.

A further object of this invention is to an active noise cancellation system for an exhaust system wherein the diameter/size of the exhaust pipe can be of standard size.

A still further object of this invention is to provide an actively controlled muffler configuration that prevents ingestion of exhaust gases into the loudspeaker enclosure.

Yet another object of this invention is the provision of a venturi means in an active noise cancellation exhaust system to create a differential pressure adjacent the speaker enclosure.

Figure 2:
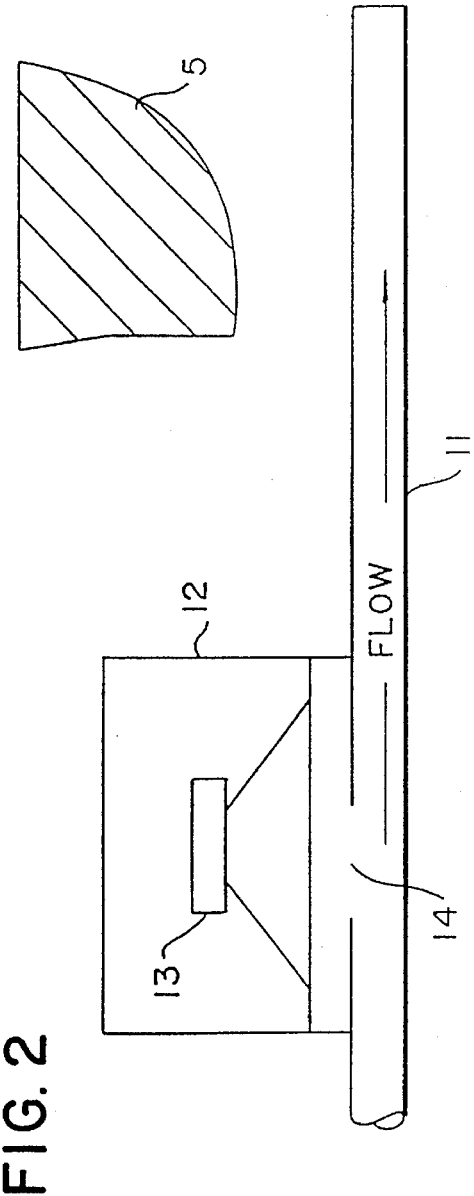
Figure 3:
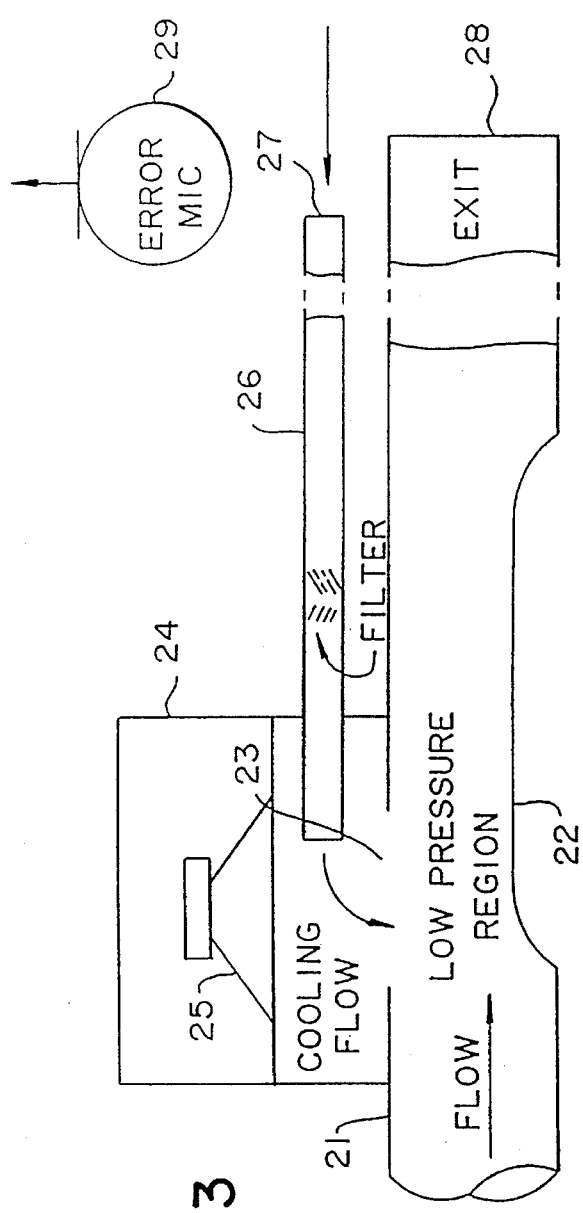
Figure 5:
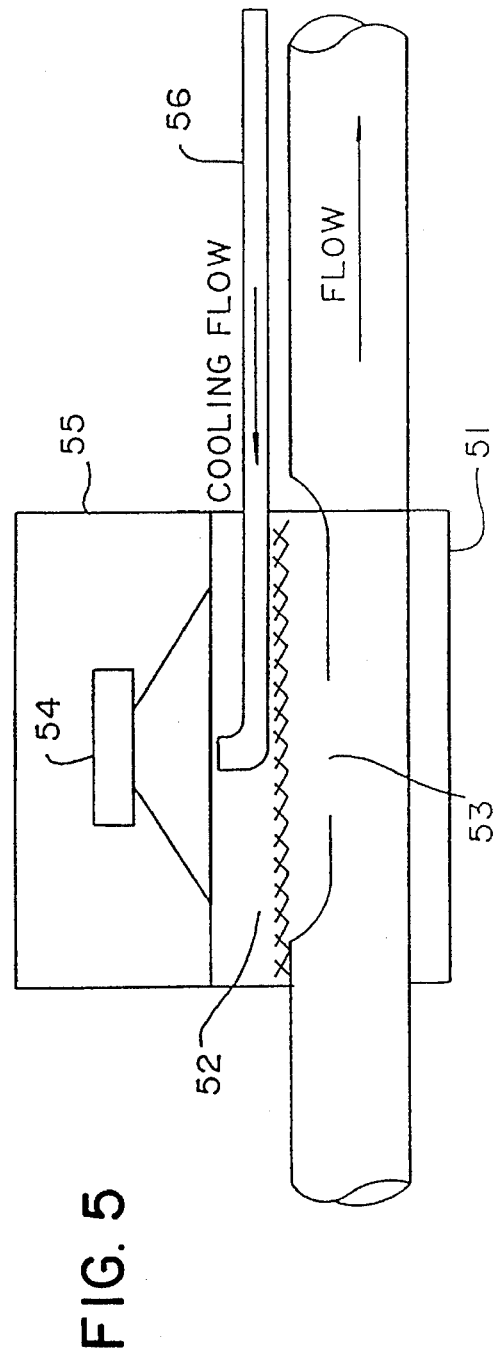

These and other objects of this invention not specifically enumerated herein will become apparent as reference is made to the following detailed discussion and drawings in which FIG. 1 is a diagrammatic view of a standard active noise cancellation muffler, and FIG. 2 is a diagrammatic view of an improved configuration of an improved active noise cancellation muffler system and FIG. 3 is a diagrammatic view of an in-pipe or venturi configuration in an improved active noise cancellation muffler, and FIG. 4 is a diagrammatic view of a venturi nozzle configuration in an active noise cancellation muffler to reduce radiation heating, and FIG. 5 is another diagrammatic view of an in-pipe or venturi configuration in an improved active noise cancellation muffler showing a separate heat shield, and FIG. 6 is a diagrammatic view of a partial venturi nozzle configuration in an active noise cancellation muffler.

Referring to the figures, FIG. 1 shows a state-of-the-art active noise cancellation muffler having an exhaust pipe 1, a speaker enclosure 2 containing a loudspeaker 3 and having an extension which is co-axial and larger than pipe 1 and which also extends back beyond fender 5 and terminates in the same plane as pipe 1.

Demands on the performance of the muffler suggest that the loudspeakers must function up to 500Hz and this causes considerable problems in the design of the loudspeaker units for the following reasons:

(a) The current design of the active muffler requires the loudspeaker units to be positioned in front of the rear fender, and yet the exit from the loudspeaker enclosure must be at the end of the muffler pipe which is behind the fender.

(b) Inevitably, this leads to a "snout" on the enclosure that is several inches long, and the acoustic mass of the air in the snout is considerable.

(c) At high frequencies it is difficult to move the slug of air in the snout backwards and forwards sufficiently to generate much anti-sound. This requires a very small volume between the loudspeaker and the snout, and results in a a very large magnet assembly for the loudspeaker unit.

In order to avoid the large moving mass of the snout, it is essential to keep the snout very short indeed, and this precludes the use of the current design.

FIG. 2 shows an improved system wherein the noise is cancelled directly in the muffler pipe. Exhaust pipe 11 is directly open to enclosure 12 containing loudspeaker 13. There is no long extension or snout and the advantages of this configuration are (a) the link between the loudspeaker and the pipe can be very short, therefor reducing the moving mass;

(b) The active system can be placed at any convenient location in the muffler pipe (although far from the engine has the benefits of reduced sound pressure and temperature);

(c) provided only one acoustic mode can propagate in the exhaust pipe over the control bandwidth, the controller can in principle "cancel" the exhaust noise perfectly; this is not the case with the state of the art configuration because the source and anti-source are not quite coincident;

(d) the diameter of the tail-pipe on the muffler need be little, if any, larger than it would be on a passive system;

(e) overall loudspeaker enclosure volume is reduced somewhat.

The main disadvantages of this improved configuration, however are:

(a) the high temperature that the loudspeaker unit might be subject to;

(b) ingestion of exhaust gases into the front cavity or the loudspeaker enclosure and consequent corrosion.

In order to circumvent these problems, the present invention manipulates the mean flow of the exhaust gases to force a clean, cooling airflow through the front (and/or back) cavities of the loudspeaker enclosure. One configuration is shown in FIG. 3.

An exhaust pipe 21 has a reduced section as at 22 so as to produce a low pressure region at opening 23 into enclosure 24. Loudspeaker 25 is mounted in enclosure 24 so as to cancel, by counter-sound, noise emanating at the exit 28.

The smooth contraction/expansion (a "venturi") 22 is used to generate locally in the pipe a region that is below atmospheric pressure. A bleed pipe 26 in the front cavity of the loudspeaker enclosure 24 permits air from outside to flow towards the low pressure region, thereby reducing ingestion of exhaust gases into the loudspeaker enclosure, and also providing cooling.

By keeping the entrance 27 to the bleed pipe a little away from the exhaust exit 28, a cleaner flow will result, and help to reduce corrosion. On the other hand, some sound will escape from the bleed pipe, and it is advantageous to position the entrance of the bleed pipe close to the residual error microphone 29 so that the control system will "cancel" the combined sound of the exhaust and bleed pipe noises. If pipe 26 is quite long, and not too large in diameter, radiation will not be very strong and will be very frequency selective. The addition of a filter in the bleed pipe could also help to reduce the radiated noise. When radiation from the bleed pipe is not a problem, its entrance can be placed wherever is convenient.

Bleed-pipe routing should avoid water traps ("sumps"), and it may be possible for the bleed pipe to drain the loudspeaker enclosure in the event of flooding.

To avoid having the loudspeaker unit(s) face directly into the hole in the muffler pipe since radiation of heat from the hot gasses could then directly heat the loudspeaker diaphragms (this may not be a serious problem as the emissivity of the gas is likely to be much lower than that of the pipe), the hold 42 in the muffler pipe 41 is arranged so that the loudspeaker is shielded by the muffler pipe itself. See FIG. 4. A bleed pipe 45 conducts a cooling flow into speaker enclosure 44.

As shown in FIG. 5 a separate heat shield 52 can be used in conjunction with exhaust pipe 51 with its opening 53 across from loudspeaker 54 in speaker enclosure 55. A cooling flow is brought in through cooling bleed pipe 56.

The heat shield can be a reflective coated substratum that is acoustically transparent (e.g. a coated "foam"; overlapping, separated grids etc.) and span most or all of the width of the front cavity, or it can be a solid shield just large enough to "shadow" the diaphragm from the hot components without introducing significant acoustic blockage. It can be adequate just to have a reflective coating on heat-sensitive parts such as the diaphragm.

The crucial aspects of this design are:

(a) generating the cooling flow with the minimum backpressure for the exhaust flow; and (b) the detailed fluid mechanics of the flow through the section in order to reduce turbulence, ingestion of gases into the loudspeaker enclosure (despite the cooling flow), flow-excited instabilities and flow noise.

Although on average the cooling flow will be flowing into the muffler pipe, the strong oscillatory component in the muffler flow and the anti-sound may cause the flow to reverse instantaneously and ingest exhaust gases into the loudspeaker enclosure. This is not a problem provided that on average the cooling flow keeps the exhaust gas concentration in the front cavity at a reasonable level.

The classical venturi arrangement of a smooth contraction followed by a diffuser section is not the only way of producing a low pressure region in the muffler flow (although it is a good one), for example a contraction followed by an abrupt expansion will also work, but with potentially higher backpressure penalties. One example of an alternative to the full venturi is sketched in FIG. 6. The principle of the idea is that the mean flow of the exhaust gasses is manipulated in such a way that an auxiliary cooling flow can be generated.

An exhaust pipe 61 is shown to have a partial venturi effect produced by split opening 62 which opens the pipe to speaker enclosure 63 containing loudspeaker 64 and bleed pipe 65.

Forced cooling of the loudspeakers by e.g. fans can obviously be done, but this would increase the complication and cost of the system. It is also possible to use the car's forward motion to drive a cooling flow over the loudspeakers, but this would not work with the car stationary. Cooling with fluid (e.g. by tapping into the engine-cooling circuit) will also work, again at the cost of complexity, but it might be difficult to get sufficient cooling on moving parts such as the diaphragms.

Having described several aspects of the invention it is anticipated that other variations will occur to those of ordinary skill in the art without departing from the scope of the appended claims.

What is claimed is as follows:

1. An active noise canceled muffler system comprising:

an exhaust pipe, having a front end and a rear end, for expelling exhaust gases;

an aperture in said exhaust pipe disposed between said front end and said rear end of said exhaust pipe;

an enclosure mounted adjacent said exhaust pipe and over said aperture containing at least one loudspeaker means adapted to produce opposite sound from that emanating from said exhaust pipe through said aperture, said enclosure surrounding part of said exhaust pipe;

a venturi effect means in said exhaust pipe adjacent said aperture for generating a low pressure region in said exhaust pipe, said low pressure region being below atmospheric pressure;

a conduit means having a first end and a second end, said first end being disposed in said enclosure adjacent said low pressure region and said second end being spaced from said rear end of said exhaust pipe, for allowing ambient air to flow to said low pressure region to thereby prevent or inhibit any exhaust gases from coming into contact with said loudspeaker means.

2. An active noise canceled muffler system comprising:

an exhaust pipe, having a front end and a rear end, for expelling exhaust gases;

an aperture in said exhaust pipe disposed between said front end and said rear end of said exhaust pipe;

an enclosure mounted adjacent said exhaust pipe and over said aperture containing at least one loudspeaker means adapted to produce opposite sound from that emanating from said exhaust pipe through said aperture;

a venturi effect means in said exhaust pipe adjacent said aperture for generating a low pressure region in said exhaust pipe, said low pressure region being below atmospheric pressure;

a conduit means having a first end and a second end, said first end being disposed in said enclosure adjacent said low pressure region and said second end being spaced from said rear end of said exhaust pipe, for allowing ambient air to flow to said low pressure region to thereby prevent or inhibit any exhaust gases from coming into contact with said loudspeaker means;

wherein said aperture on said exhaust pipe is located on the side thereof immediately opposite from said loudspeaker means.

3. An active noise canceled muffler system comprising:

an exhaust pipe having a front end and a rear end, for expelling exhaust gases;

an aperture in said exhaust pipe disposed between said front end and said rear end of said exhaust pipe;

a depressed cross-sectional area in said exhaust pipe, said aperture contained in a section of said exhaust pipe opposite said depressed cross-sectional area, wherein said depressed cross-sectional area of said exhaust pipe is adapted to produce a low pressure region;

an enclosure mounted adjacent said exhaust pipe and over said aperture containing at least one loudspeaker means adapted to produce an opposite sound from that emanating from said exhaust pipe through said aperture;

a venturi effect means in said exhaust pipe adjacent said aperture for generating a low pressure region in said exhaust pipe, said low pressure region being below atmospheric pressure;

a conduit means having a first end and a second end, said first end being disposed in said enclosure adjacent said low pressure region and said second end being spaced from said rear end of said exhaust pipe, for allowing ambient air to flow to said low pressure region to thereby prevent or inhibit any exhaust gases from coming into contact with said loudspeaker means.

4. A system as in either of claims 1, 2, or 3, further comprising an acoustically transparent heat shield located between said loudspeaker means and said low pressure region.

5. A system in either of claims 1, 2, or 3, further comprising an acoustically transparent heat shield located between said loudspeaker means and said exhaust pipe.

* * * * *